United States Patent [19]

Staab et al.

[11] Patent Number: 4,563,261
[45] Date of Patent: Jan. 7, 1986

[54] GAS DIFFUSION ELECTRODE WITH A HYDROPHILIC COVERING LAYER, AND PROCESS FOR ITS PRODUCTION

[75] Inventors: Rudolf Staab; Jürgen Russow, both of Kelkheim, Fed. Rep. of Germany

[73] Assignees: Hoechst Aktiengesellschaft, Fed. Rep. of Germany; Hoechst Aktiengesellschaft, Fed. Rep. of Germany

[21] Appl. No.: 648,014

[22] Filed: Sep. 6, 1984

[30] Foreign Application Priority Data

Sep. 9, 1983 [DE] Fed. Rep. of Germany ....... 3332566

[51] Int. Cl.$^4$ ............................................. C25B 11/00
[52] U.S. Cl. ................. 204/290 R; 264/126; 264/127
[58] Field of Search .................... 204/290 R; 264/126, 264/127

[56] References Cited

U.S. PATENT DOCUMENTS 4,278,525  7/1981  Gestaut ........................... 204/290 R
4,377,496  3/1983  Solomon ......................... 204/290 R

*Primary Examiner*—John F. Niebling
*Attorney, Agent, or Firm*—Connolly and Hutz; Connolly and Hutz

[57] ABSTRACT

A gas diffusion electrode for the reduction of oxygen, which contains a hydrophobic electro-catalyst layer, is described. One side of this layer is covered with a hydrophilic layer which is composed of at least one transition metal or an oxide or mixed oxide of transition metals and can also contain a current collector in the form of a mesh. For producing the gas diffusion electrode, a hydrophobic electro-catalyst layer can first be prepared from a pulverulent mixture which contains the electro-catalyst and a hydrophobic polymer, and at least one transition metal or an oxide or mixed oxide of transition metals can be applied in a finely divided form to one side of this layer and bonded to the hydrophobic electro-catalyst layer by the application of pressure.

8 Claims, 1 Drawing Figure

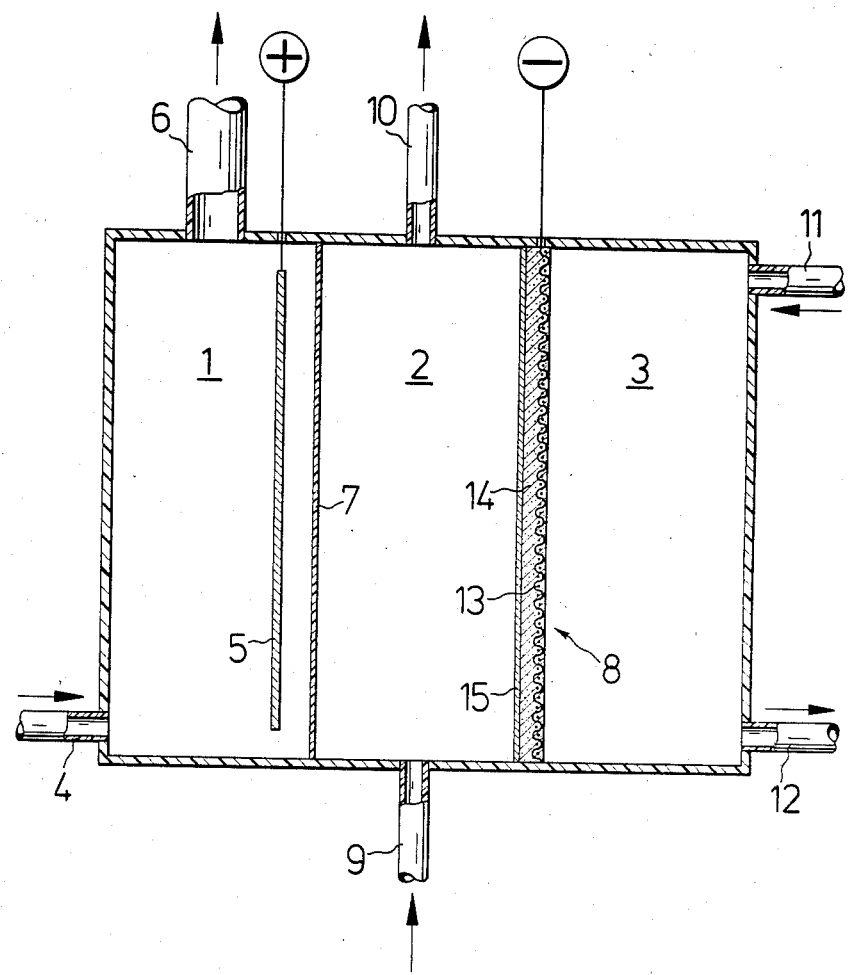

GAS DIFFUSION ELECTRODE WITH A HYDROPHILIC COVERING LAYER, AND PROCESS FOR ITS PRODUCTION

The present invention relates to a gas diffusion cathode for the reduction of oxygen in alkaline solution, which cathode is provided on one side with a hydrophilic covering layer.

The aqueous electrolysis of sodium chloride is an important process for the manufacture of the heavy chemicals chlorine and caustic soda. A modern variant is carried out in a diaphragm cell. In this process, the electrolytic cell comprises an anode space with an anode and a cathode space with a cathode, and a cation exchanger diaphragm which separates the two electrolysis spaces. When a saturated sodium chloride solution is fed into the anode space, the chloride ions are discharged at the anode under the action of electric current, to give elemental chlorine. At the same time, water is dissociated at the cathode with the formation of elemental hydrogen and hydroxide ions. Approximately at the same rate as hydroxide ions are formed, sodium ions migrate from the anode space through the diaphragm into the cathode space. The underlying chemical reaction corresponds to the following equation:

$$2NaCl + 2H_2O \rightarrow 2NaOH + Cl_2 + H_2.$$

The hydrogen produced represents an undesired by-product. The potential for the evolution of hydrogen according to the equation $$2H_2O + 2e^- \rightarrow H_2 + 2OH^-$$

is $-0.83$ V, relative to the standard hydrogen electrode. By polarizing the cathode with oxygen, a reaction corresponding to the following equation:

$$2H_2O + O_2 + 4e^- \rightarrow 4OH^-$$

can be forced to take place at the negative pole of the electrolytic cell. The potential of this reaction is $+0.40$ V, relative to the standard hydrogen electrode. Consequently, due to the polarization which takes place in oxygen diffusion cathodes, 1.23 V of cell voltage can theoretically be saved in the chloro-alkali electrolysis. In times of high energy costs, this is of considerable economic importance.

The figure diagrammatically shows an electrochemical cell for the electrolysis of aqueous sodium chloride solutions, which is fitted with a gas diffusion electrode. The cell is divided into an anode space (1), a cathode space (2) and a gas space (3). Saturated sodium chloride brine is pumped via a feed line (4) into the anode space (1). At the anode (5), chloride ions are discharged to elemental chlorine. Preferably, dimensionally stable anodes of titanium are used, which are provided with activation in order to minimize the chlorine overvoltage. The chlorine formed and the depleted brine leave the anode space (1) via line (6). Between (1) and the cathode space (2), there is a cation exchanger diaphragm (7), through which the sodium ions migrate into the cathode space under the influence of the electric current.

The reaction water is fed in the form of deionized water or dilute sodium hydroxide solution via the feed line (9) to the cell. In the cathode space (2), sodium hydroxide solution is formed which leaves the cell via the opening (10).

Cathode space (2) and gas space (3) are separated from one another by the gas diffusion electrode (8) which serves as the cathode. An oxygen-containing gas (pure oxygen, $CO_2$-free air or air which has been enriched with oxygen and/or moistened) is introduced via pipe (11) into the gas space (3). The gas penetrates into the diffusion electrode, oxygen being reduced. The remaining gas, in general depleted of oxygen, finally leaves the cell via the line (12).

The electrode (8) represents a porous body which permits access of the reactants water and oxygen. In the main, it comprises an electrochemically active material which catalyzes the reduction of oxygen. Frequently, the electrode is made in a supported form, i.e. a mesh-type current collector consisting of metal is incorporated into the electro-catalyst layer or supports it from the outside. Porous metals, such as platinum black, silver black or nickel black, other substances, such as phthalocyanines, mixed oxides of the spinel type or perovskite type, and active carbon, which latter can have been activated with a catalyst suitable for the reduction of oxygen, are used as the electro-catalyst.

To prevent the pores of the electrode from completely being filled with electrolyte during operation so that the oxygen feed would be interrupted, a hydrophobic material, preferably polytetrafluoroethylene (PTFE) is frequently incorporated into the electrochemically active material. It is also possible to coat only one outer side with a hydrophobic covering layer of active carbon/PTFE which has not been activated (European Patent Application No. 051,432). Hydrophobic electrodes containing PTFE are described, for example, in U.S. Pat. Nos. 4,350,608, 4,339,325, 4,179,350, 3,977,901 and 3,537,906.

The required cell voltage of such a cell is composed of the electrode potentials, the overvoltages on the two electrodes, the diaphragm resistance and the voltage drop within the electrolyte. The overvoltages on the electrodes can be influenced by the selection of a suitable electrochemically active electrode material. The diaphragm resistance is constant and is given by the choice of cation exchanger diaphragm. The electrolyte resistance can be reduced by arranging the two electrodes as close to one another as possible. Since the cell must be supplied with water, the distance between cathode and anode cannot be less than a defined figure. In practice, however, the distance between the diaphragm and the gas diffusion electrode will be kept as small as possible. Distances of between 0.5 and 3 mm, in particular between 0.5 and 1 mm, have proved suitable. However, this small distance can also be a disadvantage in the operation of a cell. If the electrode allows a little gas to pass, which is the case, for example, with aged electrodes or with electrodes with slight mechanical damage, gas bubbles form on the catholyte side of the cathode (=gas diffusion electrode), and these make mass transfer more difficult and increase the electrical resistance. The cell voltage rises as a result. Due to the small distance between membrane and cathode, there is also the danger that the gas bubbles in the catholyte gap adhere to the hydrophobic diaphragm and to the hydrophobic cathode, i.e. are not entrained by the caustic solution produced. This has the consequence that not only the resistance in the electrolyte is increased, but also that parts of the cathode surface are blocked for the reaction.

It was therefore the object to prevent adhesion of the gas bubbles to the oxygen diffusion cathode and to ensure that any gas bubbles (air or $O_2$) formed are removed from the catholyte gap.

The present invention achieves this object by using a gas diffusion electrode for the reduction of oxygen, which electrode contains a hydrophobic electrocatalyst layer and wherein one side of the electro-catalyst layer is covered with a hydrophilic layer comprising at least one transition metal or an oxide or mixed oxide of transition metals.

The electrode according to the invention preferably has the form of a flat surface. It is particularly suitable for the reduction of oxygen in an alkaline medium, i.e. under the conditions of the aqueous chlor-alkali electrolysis. The adhesion of gas bubbles to the hydrophilically coated side is prevented. Surprisingly, such coated electrodes possess a higher electrochemical activity and hence a lower overvoltage than uncoated electrodes.

The transition metals, which are used in the form of the metals or oxides for coating, are in particular selected from the group comprising titanium, chromium, manganese, iron, cobalt, nickel, copper, zinc, silver, ruthenium, rhodium, palladium, osmium, iridium and platinum. Coating with the electro-catalytically active metals silver and platinum, and in particular with nickel, is advantageous. To apply nickel with an especially large surface area, a procedure can be used in which the electrode is first coated with a nickel-aluminum alloy and subsequently the aluminum fraction of the alloy is dissolved out by treatment with aqueous caustic. This can be effected either before the electrode is installed in the cell or during use as the cathode in the aqueous alkali metal chloride electrolysis by means of the alkali metal hydroxide being formed. It is also possible to use alloys which contain several transition metals, and mixtures of transition metal oxides. When Oxides are used for coating, oxides selected from the group comprising titanium oxide, manganese-IV oxide, zinc oxide and silver oxide are preferred. Moreover, it is possible to apply several different oxides successively to the hydrophobic electro-catalyst layer.

Preferably, the hydrophobic electro-catalyst layer is prepared on the basis of metallic silver.

In the FIGURE, the electrode (8) according to the invention can be seen diagrammatically in cross-section. An embodiment is shown, in which the current is supplied by means of a current collector (13) in the form of a mesh. Preferably, this is a metal mesh of nickel or silver-plated nickel; in addition to supplying current, the mesh also takes care of the current distribution within the catalyst layer (14). The hydrophilic covering layer (15) is applied to (14). It prevents the adhesion of gas bubbles to the electrode surface and facilitates the supply of water to the actual reaction zone and removal of the hydroxyl ions formed. The reaction takes place at the water/oxygen/electro-catalyst three-phase boundary which is to be formed within (14).

It is advantageous to use a hydrophilic coating material with the finest possible particles, in particular material of a particle size below 0.063 mm. Very fine fractions can be obtained by grinding, chopping in a cross beater mill or comminuting by means of a mortar and pestle, following by screening. The thickness of the coating with hydrophilic material should be between 1 and 200 mg/cm$^2$, in particular between 2 and 50 and preferably between 2.5 and 20 mg/cm$^2$.

The gas diffusion electrode according to the invention can be produced by first preparing a hydrophobic catalyst layer (in most cases in the form of a flat surface) from a pulverulent mixture which contains the electrocatalyst and a hydrophobic polymer. At least one transition metal or an oxide or mixed oxide of transition metals is applied in a finely divided form to one side of this layer and bonded to the hydrophobic electrocatalyst layer by the application of pressure.

For preparing the electrophilic layer, for example, a suspension of a hydrophilic material, as indicated, can be applied in water or in an organic solvent (suh as, for example, alcohol, methylene chloride or petroleum ether) to the hydrophobic electro-catalyst layer, where the liquid phase is allowed to evaporate. The suspension indicated can also be filtered, the hydrophobic electrocatalyst layer representing the filter, or the hydrophilic material can be uniformly applied in powder form to the electro-catalyst layer, for example by means of a screen. By subsequent pressing or rolling (application of pressure), the coating material is intimately bonded to the raw electrode. The application of heat is here advantageous, because the hydrophobic fraction of the electrocatalyst layer becomes thermoplastic, at least at high temperatures.

Very good results were obtained when the hydrophobic electro-catalyst layer is produced by reductive deposition of silver on the small suspended particles of a plastic latex according to German Patent Application No. P 33 03 779.5. In this case, an aqueous dispersion of a hydrophobic organic polymer (in particular PTFE), a silver salt solution and a reducing agent for silver ions (for example formaldehyde) are combined at 0°–50° C. and a pH value is maintained at which the dispersion used is stable and the silver salt is reduced. pH values from 4 to 11, in particular 9 to 10, are suitable for PTFE dispersions. Relative to the quantity of the starting products, the weight ratio of the silver and the dry matter of the organic dispersion is 20:80 to 90:10.

However, hydrophobic electro-catalyst layers produced by a different route can also be coated according to the invention.

The invention is illustrated in more detail by the examples which follow.

EXAMPLE 1

80 ml of water and 30 ml of 35% formaldehyde solution are added to 4.7 g of a commercially available 40% aqueous polytetrafluoroethylene dispersion (trade name Hostaflon ®TF 5033) and this mixture is cooled to 0° to 10° C. In the course of about one hour a solution of 16.7 g of silver nitrate in 130 ml of water is added dropwise and simultaneously 130 ml of 10% potassium hydroxide solution. During the dropwise addition, the reaction mixture is vigorously mixed; the reaction temperature should not exceed 15° C. The potassium hydroxide solution should be metered in such a way that the pH value does not rise above 10 and does not fall below 7.5. When the reaction has ended, the precipitate formed is allowed to settle, and the supernatant mother liquor is decanted. The remaining solid is washed first with 100 ml of water and then with 200 ml of petroleum ether, and the electrocatalyst thus obtained is dried at 120° C. (yield 12.3 g, silver content about 85% by weight).

2 g of electro-catalyst are chopped in a cross beater mill (manufacturer: Janke and Kunkel, Staufen) at 20,000 rpm for 10 seconds and then suspended in 20 ml of isopropanol. The suspension thus obtained is poured into a membrane filter having an internal diameter of 4.2 cm, and the solvent is removed by suction, until a still moist filter cake remains. The latter is then pressed under a pressure of 19.6 bar into a silver-plated nickel mesh of 0.25 mm mesh width and 0.16 mm wire thickness. After drying at 110° C. in a drying cabinet, the raw electrode is ready for coating. 170 mg of zinc oxide, comminuted by mortar and pestle, are screened through a metal mesh of 0.063 mm mesh width onto the raw electrode. By means of a ram under a pressure of 60 bar, the zinc oxide is then pressed into the surface of the electrode and subsequently the latter is sintered at 250° C. The gas diffusion electrode prepared in this way has a coating of zinc oxide of about 12 mg/cm$^2$. The measured potentials of this electrode versus a saturated calomel electrode (SCE) are listed in Table 1.

EXAMPLE 2

An electrode was prepared analogously to Example 1, except that, instead of zinc oxide, manganese dioxide was used, the largest particles of which passed through a screen of 0.06 mm mesh width. The coating of the electrode was about 16 mg/cm$^2$ of MnO$_2$. The measured potentials versus SCE are shown in Table 1.

EXAMPLE 3

Example 1 was repeated, except that silver oxide was used as the coating material (24 mg/cm$^2$). The measured potentials versus SCE are to be found in Table 1.

EXAMPLE 4

An electrode was prepared analogously to Example 1, except that iron powder of 0.06 mm grain size was used as the coating material. The coating of the electrode with iron was about 28 mg/cm$^2$. The measured potentials versus SCE are listed in Table 1.

EXAMPLE 5

An electrode was prepared analogously to Example 1, except that nickel powder of 0.06 mm grain size was used as the coating material. The coating of the electrode with nickel was about 36 mg/cm$^2$. The measured potentials versus SCE are listed in Table 1.

EXAMPLE 6

An electrode was prepared analogously to Example 1, except that, in place of zinc oxide, silver powder was used for coating. The coating of this electrode with silver was about 18 mg/cm$^2$. The measured potentials versus SCE are listed in Table 1.

EXAMPLE 7

280 ml of water and 45 ml of 35% formaldehyde solution are added to 9.4 g of an aqueous polytetrafluoroethylene dispersion (trade name Hostaflon ®TF 5033-40%) and this mixture is cooled to 0° to 10° C. In the course of about 3.5 hours, a solution of 30.3 g of silver nitrate and 3.2 g of mercury-(II) nitrate in 450 ml of water is added dropwise and simultaneously 310 ml of 10% potassium hydroxide solution. During the dropwise addition, the reaction mixture is vigorously mixed; the reaction temperature should not exceed 15° C. The potassium hydroxide solution should be metered in such a way that the pH value does not rise above 10; the pH value should not fall below 7.5. When the reaction has ended, the precipitate formed is allowed to settle, the supernatant mother liquor is decanted and the remaining solid is washed first with water and then with petroleum ether. After drying at 110° C., the yield of catalyst material is 24.8 g. The silver content of the material prepared in this way is about 77% by weight, and the mercury content is 8% by weight.

1 g of this material was intimately mixed in a cross beater mill with 1 g of ground sodium chloride and then slurried in 10 ml of isopropanol. The suspension was poured into a membrane filter having an internal diameter of 4.2 cm, and the isopropanol was removed by suction. The still moist filter cake was pressed under a pressure of 20 bar into a silver-plated nickel mesh of 0.25 mm mesh width and 0.16 mm wire thickness. After drying at 110° C. for one hour, the raw electrode was dusted with 170 ml of a nickel-aluminum alloy which was composed of 50% by weight of each of the two metals. The particle size was less than 0.063 mm. The dusted electrode was then compressed under a pressure of 60 bar and sintered for 15 minutes at 250° C. The sintered electrode was placed for 15 hours into 10% sodium hydroxide solution, in order to dissolve out the aluminum and the sodium chloride serving as a pore former. After washing in deionized water and drying at 110° C., the coating of the electrode was about 65 mg/cm$^2$ of catalyst and about 6 mg/cm$^2$ of a Raney nickel layer. The measured potentials versus a saturated calomel electrode are listed in Table 1.

An electrode prepared analogously and having an active surface area of 40 cm$^2$ was operated over 20 weeks in an electrolytic cell, 8.25N sodium hydroxide solution being produced. At a temperature of 80° C. and a current loading of 3 kA/m$^2$, the cell voltage was 2.14 V. Even though the cathode gap was only 1 mm wide, no adhesion of gas bubbles between the electrode and the cation exchanger diaphragm was observed.

EXAMPLE 8 (COMPARISON EXAMPLE)

An electrode was prepared analogously to Example 1, but without a coating with ZnO. The potentials of this electrode versus SCE are listed in Table 1. Gas bubbles passing through the electrode adhere to the electrode surface and can often be expelled only by shaking the electrolytic cell. The "gas bubble effect" arises, and the cell voltage rises by up to 200 mV. When the gas bubbles are expelled by shaking the electrolytic cell, the cell voltage falls to the initial value.

TABLE 1

| Electrode potentials versus SCE in 33% sodium hydroxide solution at 80So#C (reaction gas: oxygen) | | | | |
|---|---|---|---|---|
| | Potentials versus SCE at loading with current densities of | | | |
| Coating material | 1 kA/m$^2$ | 2 kA/m$^2$ | 3 kA/m$^2$ | 4 kA/m$^2$ |
| Zinc oxide | 200 mV | 270 mV | 340 mV | 400 mV |
| Manganese dioxide | 180 | 240 | 300 | 370 |
| Silver oxide | 180 | 230 | 280 | 320 |
| Iron powder | 230 | 320 | 400 | 470 |
| Nickel powder | 190 | 250 | 310 | 380 |
| Silver powder | 190 | 240 | 300 | 350 |
| Ni/Al alloy | 190 | 240 | 275 | 300 |
| Uncoated comparison electrode | 220 | 300 | 360 | 420 |

We claim:
1. A gas diffusion electrode for the reduction of oxygen, containing a hydrophobic electro-catalyst layer having a current collector in the form of a mesh, wherein one side of the electro-catalyst layer is covered with a hydrophilic layer having a thickness of between 1 and 200 mg/cm$^2$, the hydrophilic layer comprising at least one transition metal or an oxide or mixed oxide of transition metals.

2. The gas diffusion electrode as claimed in claim 1, wherein the current collector in the form of a mesh is located on one side of the hydrophobic electro-catalyst layer and the hydrophilic covering layer is located on the other side.

3. The gas diffusion electrode as claimed in claim 1, wherein the transition metals are selected from the group comprising titanium, chromium, manganese, iron, cobalt, nickel, copper, zinc, silver, ruthenium, rhodium, palladium, osmium, iridium and platinum.

4. The gas diffusion electrode as claimed in claim 3, wherein an oxide from the group comprising titanium oxide, manganese-IV oxide, zinc oxide and silver oxide is used.

5. The gas diffusion electrode as claimed in claim 1 produced by a process in which the hydrophobic electro-catalyst layer is first prepared from a pulverulent mixture which contains the electro-catalyst and a hydrophobic polymer, which comprises applying at least one transition metal or an oxide or mixed oxide of transition metals in a finely divided form to one side of this layer and bonding it to the hydrophobic electro-catalyst layer by the application of pressure.

6. The gas diffusion electrode produced by the process as claimed in claim 5, wherein the transition metal is nickel, a nickel-aluminum alloy is bonded to the electro-catalyst layer which has been rendered hydrophobic, and the aluminum fraction of the nickel-aluminum alloy is dissolved out by treatment with caustic solution.

7. The gas diffusion electrode as claimed in claim 1, wherein the thickness of the hydrophilic layer is between 2 and 50 mg/cm$^2$.

8. The gas diffusion electrode as claimed in claim 1, wherein the electrode consists of polytetrafluoroethylene and silver as the hydrophobic electrocatalytic layer materials.

* * * * *